United States Patent
Fitzgerald et al.

(10) Patent No.: US 11,351,642 B2
(45) Date of Patent: Jun. 7, 2022

(54) AUTOMATIC TOOL HEAD PLACEMENT AND ASSEMBLY APPARATUS FOR A BORING MACHINE

(71) Applicant: Schlumberger Technology Corporation, Sugar Land, TX (US)

(72) Inventors: Christopher Fitzgerald, Sugar Land, TX (US); E-Kiang Soh, Shanghai (CN); Jiawei Dong, Sugar Land, TX (US); Chintankumar Bharatkumar Shah, Shanghai (CN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 151 days.

(21) Appl. No.: 15/949,090

(22) Filed: Apr. 10, 2018

(65) Prior Publication Data
US 2018/0290250 A1    Oct. 11, 2018

Related U.S. Application Data

(60) Provisional application No. 62/483,517, filed on Apr. 10, 2017.

(51) Int. Cl.
*B23Q 3/157* (2006.01)
*B23Q 3/155* (2006.01)
(Continued)

(52) U.S. Cl.
CPC ......... *B23Q 3/15513* (2013.01); *B23Q 3/157* (2013.01); *B23Q 3/15503* (2016.11);
(Continued)

(58) Field of Classification Search
CPC .............. B23Q 3/15513; B23Q 3/15536; B23Q 3/157; B23Q 3/15713; B23Q 3/15503;
(Continued)

(56) References Cited

U.S. PATENT DOCUMENTS

| | | | | |
|---|---|---|---|---|
| 4,486,928 A | * | 12/1984 | Tucker | B23Q 7/046 29/26 A |
| 4,604,787 A | * | 8/1986 | Silvers, Jr. | B23Q 3/15526 29/26 A |

(Continued)

FOREIGN PATENT DOCUMENTS

| | | |
|---|---|---|
| CN | 2134257 Y | 5/1993 |
| CN | 202846263 U | 4/2013 |

(Continued)

OTHER PUBLICATIONS

Machine Translation of JP 2001-277064-A, which JP '064 was published Oct. 2001.*

(Continued)

*Primary Examiner* — Erica E Cadugan

(57) ABSTRACT

A method for machining a workpiece includes using a multi-axis robot to lift a tool head from a magazine. The robot attaches the tool head to an end of a drill tube. The drill tube is then rotated and longitudinally translated to machine the workpiece. The tool head is withdrawn from the machined workpiece longitudinally by moving the drill tube. The robot is used to disconnect the tool head, replace the disconnected tool head into a magazine and withdraw a different tool head from the magazine for attachment to the drill tube.

8 Claims, 2 Drawing Sheets

(51) Int. Cl.
  *B23Q 17/24* (2006.01)
  *B23Q 17/00* (2006.01)
(52) U.S. Cl.
  CPC ...... *B23Q 3/15536* (2016.11); *B23Q 3/15713* (2013.01); *B23Q 17/2409* (2013.01); *B23Q 2003/155404* (2016.11); *B23Q 2003/155411* (2016.11); *Y10T 483/10* (2015.01); *Y10T 483/13* (2015.01); *Y10T 483/1781* (2015.01)
(58) Field of Classification Search
  CPC ....... B23Q 2003/155411; B23Q 2003/155404; B23Q 17/2409; B23Q 3/155–3/15793; B23Q 17/24–17/2495; B25J 13/085; B25J 9/1697; B25J 9/1633; Y10T 483/10; Y10T 483/132; Y10T 483/17; Y10T 483/1714; Y10T 483/1717; Y10T 483/1781; Y10T 483/1764; Y10T 408/94–953; Y10T 409/309352; Y10T 483/13–138; B23B 41/00; B23B 41/003; B23B 41/006; B23B 41/02; B23B 41/10; B23B 41/12
  USPC ............... 483/50, 43, 7–11; 408/238–239 A; 409/231–232; 700/160–261
  See application file for complete search history.

(56) References Cited

U.S. PATENT DOCUMENTS

| | | | | | |
|---|---|---|---|---|---|
| 4,777,713 | A | * | 10/1988 | Kitamura | ................ B23B 3/065 29/27 C |
| 4,831,714 | A | * | 5/1989 | Babel | ................... B23Q 3/1578 483/3 |
| 4,837,919 | A | * | 6/1989 | Hoppe | ................. B23Q 3/1554 483/38 |
| 8,231,117 | B2 | | 7/2012 | Yaskawa et al. | |
| 9,975,180 | B2 | | 5/2018 | Fujimoto et al. | |
| 2005/0277529 | A1 | * | 12/2005 | Luscher | ............. B23Q 3/15773 483/1 |
| 2007/0087924 | A1 | * | 4/2007 | Krosta | ............... B23Q 3/15773 483/1 |
| 2008/0107239 | A1 | * | 5/2008 | Sayeh | ...................... A61N 5/10 378/148 |
| 2008/0159822 | A1 | * | 7/2008 | Giovanelli | ........... B23Q 17/003 409/131 |
| 2011/0028259 | A1 | * | 2/2011 | Miyoshi | ................... B25J 9/102 475/162 |
| 2011/0093120 | A1 | * | 4/2011 | Ando | ..................... B25J 9/1638 700/260 |
| 2011/0140330 | A1 | * | 6/2011 | Nishikawa | ......... B23K 37/0426 269/55 |
| 2011/0153076 | A1 | * | 6/2011 | Noro | ........................ B25J 15/00 700/245 |
| 2013/0103193 | A1 | * | 4/2013 | Roberts | .................. B23Q 3/155 700/245 |
| 2013/0203572 | A1 | * | 8/2013 | Denkmeier | .......... B21D 5/0254 483/58 |
| 2016/0067782 | A1 | * | 3/2016 | Fujimoto | ................ B23B 3/065 483/19 |

FOREIGN PATENT DOCUMENTS

| | | | |
|---|---|---|---|
| CN | 104668958 A | | 6/2015 |
| CN | 205734054 U | | 11/2016 |
| DE | 3338307 A1 | * | 5/1985 ............. B23Q 17/09 |
| DE | 3440604 A | * | 5/1986 |
| DE | 19510498 A1 | * | 9/1996 |
| EP | 1004393 A2 | * | 5/2000 |
| JP | 09-057564 A | * | 3/1997 |
| JP | 2001-277064 A | * | 10/2001 |

OTHER PUBLICATIONS

Machine Translation of JP 09-057564-A, which JP '564 was published Mar. 1997.*
Machine Translation of EP 1004393 A2, which EP '393 was published May 2000.*
PMC Colinet, Video of Pin and Box End Protector Applier Sequence using PMC-Colinet PAP/PAB07. Viewed at https://www.youtube.com/watch?v=HflJrDDKWTc Published May 8, 2013.
Design and Assembly Concepts, Inc., Video of Coupling and Pin Protector Installation. Viewed at https://www.youtube.com/watch?v=XRoyxJlne74 Published Aug. 13, 2014.
First Office Action received in Chinese Patent Application No. 201810315115.8 dated Mar. 1, 2021.
Second Office Action received in Chinese Patent Application No. 201810315115.8 dated Dec. 3, 2021, 11 pages with English translation.
Rejection Decision received in Chinese Patent Application No. 201810315115.8 dated Apr. 8, 2022, 10 pages with partial English translation.

* cited by examiner

AUTOMATIC TOOL HEAD PLACEMENT AND ASSEMBLY APPARATUS FOR A BORING MACHINE

CROSS REFERENCE TO RELATED APPLICATIONS

This application claims the benefit of, and priority to, U.S. Patent Application No. 62/483,517, filed Apr. 10, 2017 and titled "Automatic Tool Head Placement and Assembly Apparatus for a Boring Machine." The foregoing application is incorporated herein by this reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of machine tools used to bore elongated passages within a workpiece. More specifically, the disclosure relates to automated apparatus for changing machine tool heads on a boring machine.

Certain types of elongated tubes, for example, drill collars used in the process of drilling subsurface wellbores are components that may have multiple internal features along some or all of the length of the drill collar. Some drill collars may be machined using between 10 and 30 boring tool heads, henceforth referred to as "tool heads" on deep hole drilling or BTA type machines. These machines will be henceforth referred to as "borer machines" for convenience. The tool heads used in connection with boring features along the length of drill collars are typically connected to drill tubes on boring machines through a threaded connection. The drill tube provides rotation and precise axial motion to any particular tool head so that the appropriate features are machined into the drill collar.

Currently, whenever change of a tool head is required, a human operator has to disassemble (e.g., un-screw) the connection between the assembled tool head and the drill tube, remove and replace the tool head using a manual or mechanically assisted lifting operation, and assemble (screw together) the connection between the replacement tool head and the drill tube. In some embodiments of such borer machines each tool head may also requires a change in a bushing used to support a tool head within the pressure head of a borer machine. As the change-over process is completed manually, change-over times can range from 5 to 20 minutes depending on the complexity of the tool head(s), and the skill of the human operator(s). During tool head changeover, the borer machine is not able to operate, resulting in a loss of productivity. Additionally, the human operator is exposed to multiple health and safety risks (e.g., drop hazard, slip hazard, SIPP injuries) during each tool head change-over activity.

A technical hurdle for automated tool head change is the ability of a robot to accurately locate, and pick up a selected tool head from a wide variety of tool heads. As tool heads are currently not designed with a standardized locating or pick-up feature, it has been impractical and cost prohibitive to accommodate a wide variety tool head geometries using available robotic end effectors.

DETAILED DESCRIPTION

Figure 1:
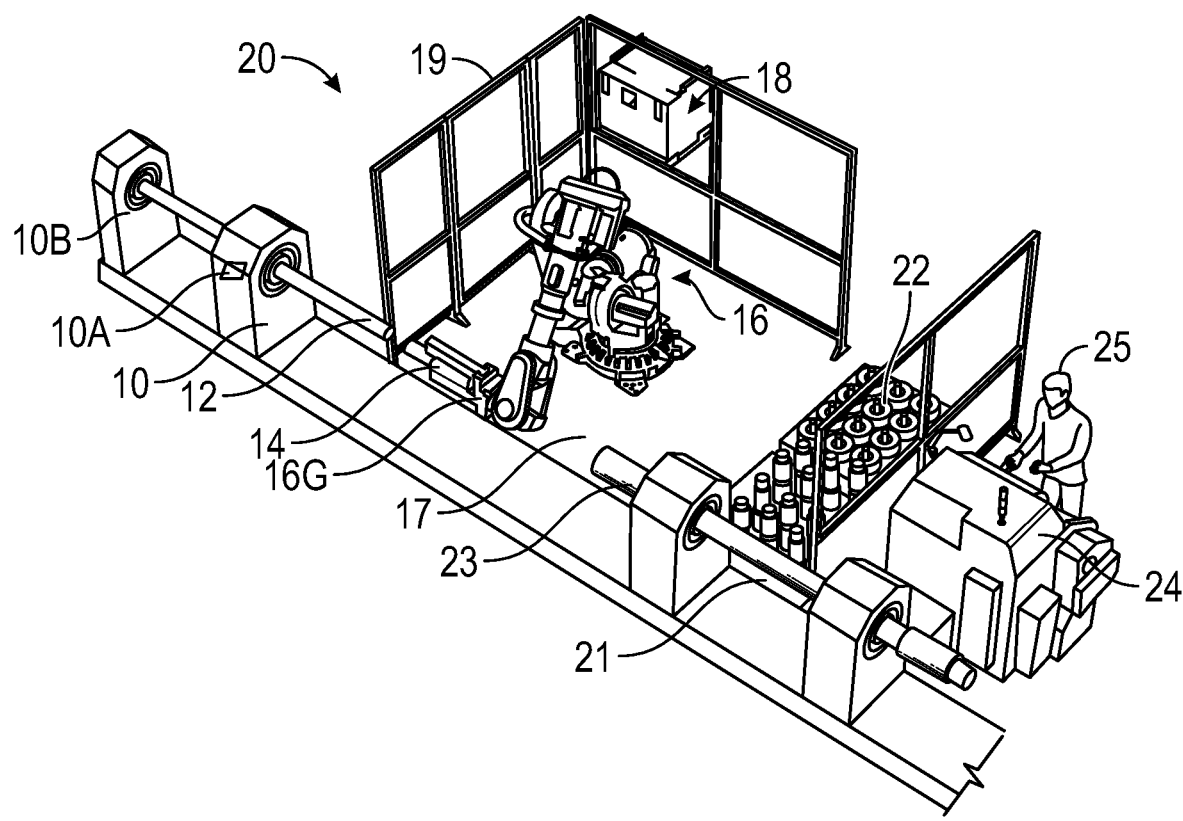
FIG. 1 shows a perspective view of an example embodiment of an automated tool head changing apparatus according to the present disclosure.

In various example embodiments of a tool head placement and assembly apparatus according to the present disclosure special tool head adapters have been designed to accommodate tool head size and/or shape variances. Robotic end effectors are only required to handle a limited number of tool head adapters, instead of the wide variety of tool heads currently in use. The tool heads will be pre-assembled to their corresponding adapters, and therefore will henceforth referred to individually as a "tool head-adapter assembly." FIG. 1 shows a perspective view of an example automated borer machine 20 according to some embodiments. The borer machine 20 may comprise a drill tube support, rotation and translation fixture ("fixture") 10. The fixture 10 may provide precise rotational support of a drill tube 12 and may include internal motors (not shown) and linear bearings (not shown) so that the drill tube 12 may be rotated and axially translated during operations. At least one second support fixture 10B may be disposed to the left of the fixture 10 in the illustration of FIG. 1 so as to provide axial support for the drill tube 12 at two spaced apart locations such that the drill tube always moves precisely on its longitudinal axis in both the rotational and translational direction. A robot 16 having an arm movable along multiple axes of rotation using motors 16A, 16B, 16C, 16D, 16E, 16F may enable a robotic end effector 16G to move to a selected position and orientation to support a tool head-adapter assembly 14 as it is assembled or disassembled from the drill tube 12. Articulated robotics arms that may be used as the robot 16 of the present disclosure are commercially available from, for example, ABB Ltd., Zurich, Switzerland.

Figure 2:
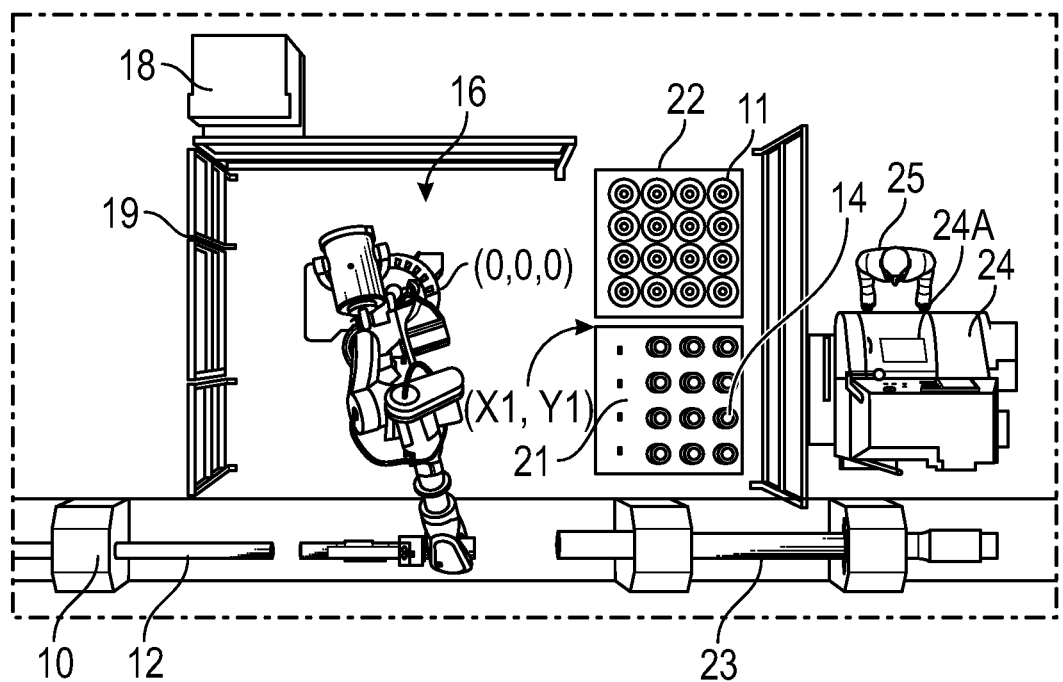
FIG. 2 shows a top view of the example embodiment shown in FIG. 1.

Referring to a top view of the borer machine 20 in FIG. 2, a geometric center of the robot 16 may be defined as an origin point (0,0,0) along a borer tool floor 17. A tool head magazine 21 may have one of its corners (X1, Y1) defined with reference to the origin point (0,0,0) such that a robot controller 18 may enable autonomous operation of the robot 16. Autonomous operation may comprise actions such that the tool head gripper 16G may be automatically positioned with respect to the tool magazine 21 to grip and retrieve a selected tool head-adapter assembly 14 from the tool magazine 21. The foregoing operation may also be performed by a human operator 25 using a human machine interface (HMI) 24A associated with a borer machine control system 24. Automated operation may be enabled by, for example, predefining the coordinates (X, Y, Z) of each tool head-adapter assembly 14 with reference to the corner (X1, Y1) of the tool head magazine 21.

Figure 3:
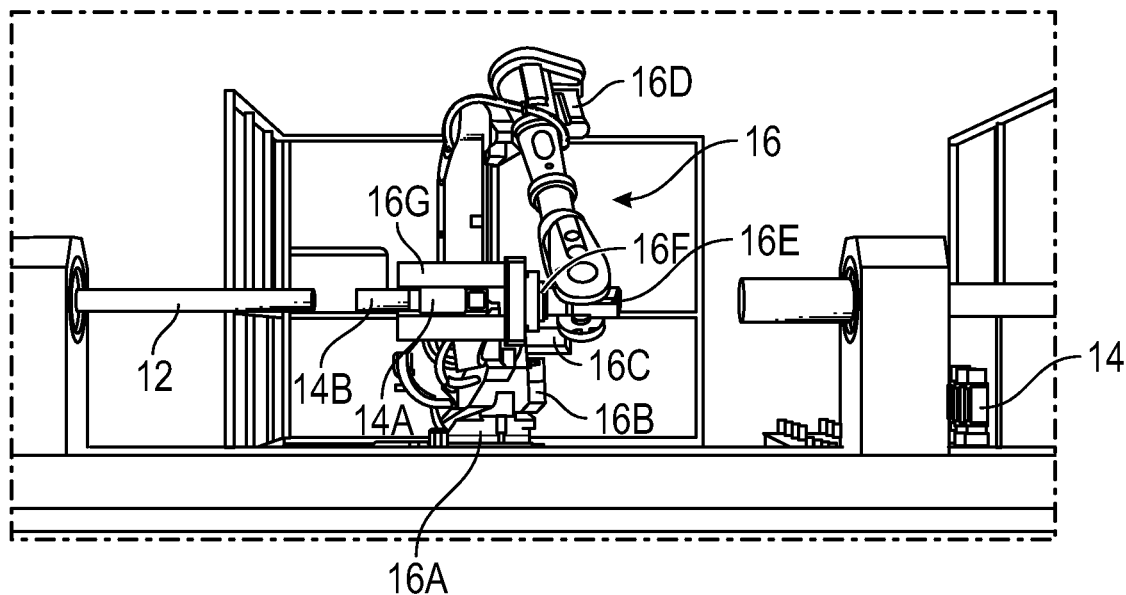
FIG. 3 shows a front view of the example embodiment shown in FIG. 1.

An example operation of the borer machine 20 shown in FIG. 1 and FIG. 3 may comprise the following actions. The borer machine human operator (25 in FIG. 2) may use the borer machine control system 24 (and the HMI 24A) to stop the borer machine 20 and may use the borer machine control system 24 to communicate with the robot controller 18 and then to operate the robot 16 to retract the currently assembled tool head-adapter assembly from the drill tube 12. In some embodiments the workpiece 23 may be a drill collar blank. A tool head-adapter assembly is brought to stop at a fixed distance from the pressure head (a known datum position on the borer machine 20). In some embodiments, stopping the borer machine 20 may be performed automatically when an axial position sensor 10A on the borer machine axial and rotational movement device 10 indicates that the drill tube 12 has advanced to a predetermined axial position, thus completing the machining operation corresponding to the tool head currently attached to the drill tube 12.

The human operator may then initiate automatic tool head-adapter assembly removal, or depending on the capability of the robot controller 18 to provide automatic control to the borer machine 20, the tool head-adapter assembly removal may be automated without the need for intervention of the human operator 25. The drill tube 12 is longitudinally retracted using the drill tube rotation and translation device 10. The robot 16 locates a tool head-adapter assembly 14 and drill tube 12. The robot 16 may grip the adapter 14B, and applies the required force to disassemble the adapter 14B (with attached tool head 14A) from the drill tube 12.

In some cases (where a high degree of torque is required), disassembly of the tool head-tool head adaptor 14 assembly from the drill tube may require the use of an end effector equipped with a torque amplifier.

The robot 16 may then place the tool head-adapter assembly 14 in a designated position in the tool head magazine 21. The robot 16 returns to the pressure head and removes a tool head bushing 11 from the pressure head. The robot 16 places the tool head bushing 11 in a designated position in a bushing magazine 22.

The human operator 25 or the borer machine control system 24 may then select the next required tool head-adapter assembly 14, and initiates an automatic tool head assembly operation. The robot 16 locates and picks up a tool head bushing 11 from a designated position in the bushing magazine 22. The robot 16 installs the bushing 11 into the borer machine pressure head.

In some embodiments, the coordinate position (X,Y,Z) of each tool head-adapter assembly 14 may be preprogrammed into the robot controller 18 so that operation of the borer machine 20 may be fully automated with respect to manufacture of a specific type or types of machined device, for example and without limitation a drill collar.

The robot 16 locates and picks up the tool head-adapter assembly 14 from a designated position in tool magazine 21. The robot 16 then applies the required force to assemble the connection between the adapter 14B (with attached tool head 14A) and the drill tube 12. The new tool head-adapter assembly 14 is thus installed and the robot 16 may release from the tool head-adapter assembly 14 and move to the home position. The home position is generally out of a path between the tool head-adapter assembly 14 and the workpiece 23 (e.g., a drill collar) so that machining operations may begin by rotating and translating the drill tube 12 and/or rotating the workpiece 23 (e.g., the drill collar). All of the machining operations may take place within safety fences 19 such that personnel are generally excluded from the borer tool floor 17 during operation of the borer machine 20.

Figure 4:
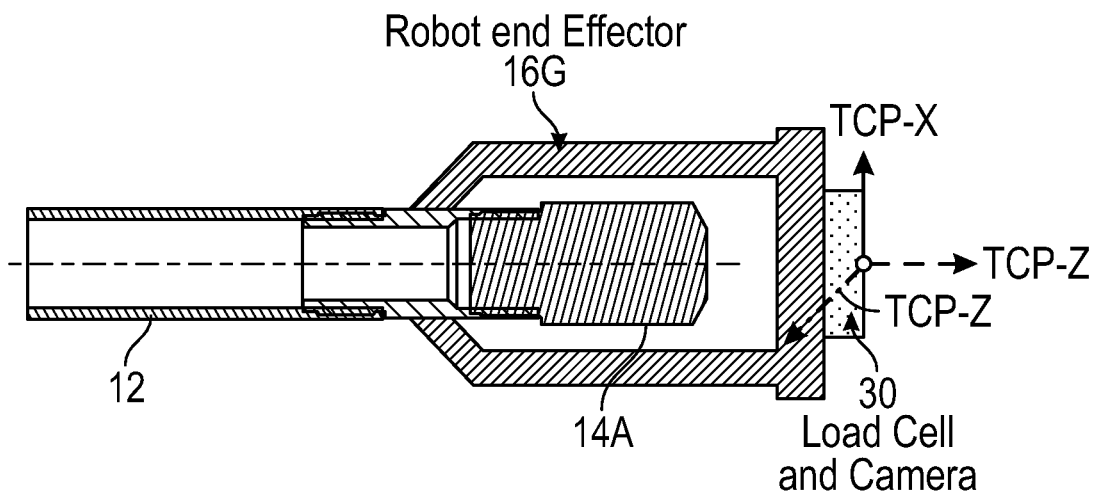
FIG. 4 shows a side view of an embodiment of a robot end effector.

A robot end effector with built-in camera and load cell may be used in some embodiments. Referring to FIG. 4, on the robot end effector 16G, a camera (part of camera and load cell assembly 30) is mounted to help the robot 16 to identify the center line of the drill tube (12 in FIG. 3). When the robot 16 approaches the drill tube 12 the camera may take multiple images of the drill tube 12 with adjustable lighting setups. These images may be used to identify the center line of the drill tube 12. The camera may either be a 2D camera or 3D camera. 2D cameras generate regular 2D images and 3D cameras generate 3D point cloud models. From the post data analysis, the robot 16 is then able to automatically identify the center line of the drill tube 12 and calculate the corresponding robot target position to initiate the connection assembly of the tool head and adapter assembly to the drill tube.

A load cell is a device that measures the force in a sensitive direction. To determine forces and torques applied by the robot and/or the drill tube, a multi-axis load cell may be arranged along three mutually orthogonal axes along all three Cartesian coordinates (X, Y, Z) defined by the robot TCP (tool center point) coordinates (TCP-X, TCP-Y and TCP-Z). Therefore, the load cells 30 are able to measure forces and torques along the TCP-X, TCP-Y, and TCP-Z directions. The load cells 30 provide the robot a "tactile" sensing capability such that the contacting forces and/or torques of the robot to the workpiece can be precisely controlled.

As shown in FIG. 4, the robot end effector 16G is assembling a tool head-tool head adaptor 14 assembly to the drill tube 12. Forces along each TCP coordinate axis are monitored by the robot control system (18 in FIG. 1). The measured forces will be used to adjust the robot end effector's orientation in real time such that the concentricity of tool head-tool head adaptor assembly 14 and the drill tube 12 can be maintained within the assembly tolerance. The foregoing arrangement can also be used for robot-performed part insertion, threading and tapping applications.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for replacing a tool head on a machine, comprising:
  using a multi-axis arm of a robot to lift a first tool head-adapter assembly from a magazine, the first tool head-adapter assembly including the tool head and an adapter, wherein the multi-axis arm of the robot includes a robot end effector, and wherein the robot end effector grips the adapter of the first tool head-adapter assembly;
  using the multi-axis arm of the robot to move and rotate the first tool head-adapter assembly along multiple axes of rotation to attach the first tool head-adapter assembly to an end of a drill tube;
  using the multi-axis arm of the robot, attaching a bushing to the end of the drill tube before attaching the first tool head-adapter assembly to the drill tube;
  rotating and longitudinally translating the drill tube to machine a workpiece;
  withdrawing the first tool head-adapter assembly from the workpiece longitudinally by moving the drill tube;
  locating the first tool head-adapter assembly with the multi-axis arm;

gripping the adapter with the robot end effector; and
using the multi-axis arm of the robot to move and rotate the first tool head-adapter assembly along multiple axes to disconnect the first tool head-adapter assembly, replace the first tool head-adapter assembly into the magazine, and withdraw a second tool head-adapter assembly from the magazine for attachment to the drill tube.

2. The method of claim 1 further comprising using the multi-axis arm of the robot to attach the second tool head-adapter assembly to the drill tube and machining the workpiece using the second tool head-adapter assembly.

3. The method of claim 1 wherein the lifting the first tool head-adapter assembly, attaching the first tool head-adapter assembly, machining the workpiece, withdrawing the first tool head-adapter assembly and disconnecting the first tool head-adapter assembly and replacing the first tool head-adapter assembly in the magazine are performed automatically by referencing a position of the magazine, the drill tube and the robot to a selected coordinate system.

4. The method of claim 1 further comprising making at least a 2 dimensional image proximate the end effector of the multi-axis arm of the robot wherein the image is used to cause the multi-axis arm to align the first tool head-adapter assembly with the drill tube.

5. The method of claim 1 further comprising measuring force along multiple axes proximate the end effector on the robot, wherein the force measurements are used by the robot to adjust a robot end effector orientation such that the concentricity of the first tool head-adapter assembly and the drill tube is maintained within a predetermined assembly tolerance.

6. The method of claim 1, wherein using the multi-axis arm of the robot to disconnect the first tool head-adapter assembly further comprises:
equipping the multi-axis arm of the robot with a torque amplifier.

7. The method of claim 1, wherein the multi-axis arm of the robot comprises a plurality of motors configured to enable rotation of the first tool head-adapter assembly along a plurality of axes of the multi-axis arm.

8. The method of claim 1, wherein the first tool head-adapter assembly is different from the second tool head-adapter assembly.

* * * * *